US007660429B2

(12) United States Patent
Shaked et al.

(10) Patent No.: US 7,660,429 B2
(45) Date of Patent: Feb. 9, 2010

(54) ERROR DIFFUSION HALFTONE WATERMARKING

(75) Inventors: Doron Shaked, Kiryat Tivon (IL); Izhak Baharav, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 944 days.

(21) Appl. No.: 10/889,327

(22) Filed: Jul. 11, 2004

(65) Prior Publication Data

US 2005/0031160 A1 Feb. 10, 2005

Related U.S. Application Data

(63) Continuation-in-part of application No. 09/594,211, filed on Jun. 14, 2000, now Pat. No. 6,763,121.

(51) Int. Cl.
G06K 9/00 (2006.01)
B42D 15/00 (2006.01)
H04L 9/32 (2006.01)
H04N 1/40 (2006.01)

(52) U.S. Cl. .................. 382/100; 283/113; 713/176; 358/3.03; 358/3.28

(58) Field of Classification Search .................. None
See application file for complete search history.

(56) References Cited

U.S. PATENT DOCUMENTS

| 5,315,098 | A | | 5/1994 | Tow | |
|---|---|---|---|---|---|
| 5,446,857 | A | | 8/1995 | Russ | |
| 5,692,109 | A | | 11/1997 | Shu | |
| 5,706,099 | A | * | 1/1998 | Curry | ................ 358/3.28 |
| 5,734,752 | A | * | 3/1998 | Knox | ................ 358/3.28 |
| 5,889,868 | A | | 3/1999 | Moskowitz | |
| 6,000,613 | A | | 12/1999 | Hecht | |
| 6,031,914 | A | * | 2/2000 | Tewfik et al. | ................ 380/54 |
| 6,233,347 | B1 | * | 5/2001 | Chen et al. | ................ 382/100 |
| 6,252,675 | B1 | * | 6/2001 | Jacobs | ................ 358/1.9 |
| 6,526,155 | B1 | | 2/2003 | Wang | |
| 6,636,616 | B1 | * | 10/2003 | Harrington | ................ 382/100 |
| 6,661,533 | B1 | * | 12/2003 | Bhaskar et al. | ................ 358/1.9 |
| 6,690,811 | B2 | | 2/2004 | Au | |
| 6,694,041 | B1 | | 2/2004 | Brunk | |
| 6,763,121 | B1 | * | 7/2004 | Shaked et al. | ................ 382/100 |
| 7,031,491 | B1 | * | 4/2006 | Donescu et al. | ................ 382/100 |

OTHER PUBLICATIONS

Fu et al., "Data Hiding for Halftone Images", Proceedings of SPIE—Security and Watermarking of Multimedia Contents II, May 2000, p. 228-236.*
Fu et al. "Data Hiding for Halftone Images", Proceedings of SPIE-Security and Watermarking of Multimedia Contents II, Jan. 24-26, 2000.
Z. Baharav, and D. Shaked, "Waterrmarking of Dither Half toned Images", HP Labs TR, HPL-98-32, Feb. 1998.
W. Bender, D. Gruhl, I'l. Morimoto, A. Lu, "Techniques for Data Hiding", IBM Systems Journal, vol. 35, pp. 313-335. 1996.
J. T. Brassil, S. Low, N. F. Maxemchuk, L. O'Gorman, "Electronic Marking and Identification Techniques to Discourage Document Copying", IEEE J. on Selected Areas in Communications, vol. 13, pp. 1495-1504,1995.
A. M. Bruckstein, and T. J. Richardson, "Holographic Transform Domain Image Watermarking Method", BeJJ-Labs Technical Report, 1997.

(Continued)

Primary Examiner—Charles Kim

(57) ABSTRACT

A watermarked halftone image is generated from a continuous tone image by performing error diffusion halftoning on the continuous tone image while adding a watermark to the halftone image during the halftoning. A location of the watermark in the halftone image may be based on prediction criteria. Error caused by adding the watermark may be diffused into the halftone image.

16 Claims, 8 Drawing Sheets

OTHER PUBLICATIONS

I. J. Cox, J. Kilian, T. Leighton, and T. Shamoon, "Secure Spread Spectrum Watermarking Multimedia", in IEEE Trans. Oil Image Proc., vol. 6, pp. 1673-1687, 1997.

I. J. Cox, and M. L. Miller, "A Review of Watermarking and the Importance of Perceptual Modeling", in Proc. Electronic Imaging 97, Feb. 1997.

R. Floyd and L. Steinberg. "An adaptive algorithm for spatial gray scall" in SID S.1'1nposium, pp. 36-37, 1975.

P. W. Wong, "Entropy-Constrained halftoning, Using Multipath Tree Coding", IEEE Trans. 011 Image Processing, vol. 6, pp. 1567-1579, 1997.

* cited by examiner

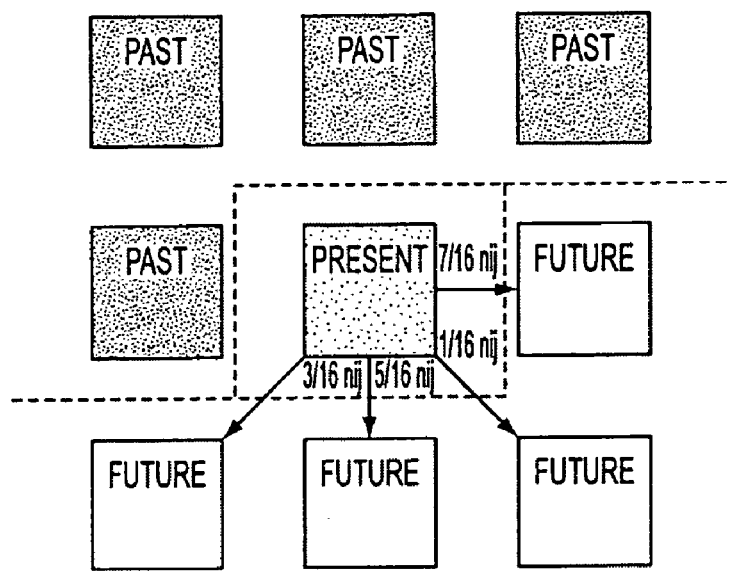
FIG. 8
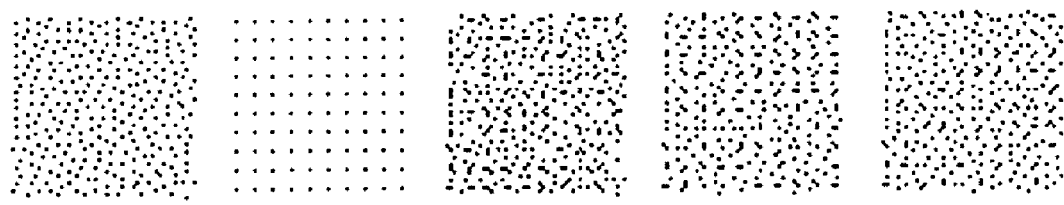
| ERROR DIFFUSION: NO WATERMARK | PRE-DETERMINED LOCATIONS | NAIVE WATERMARK | POST-THRESHOLD WATERMARK | PRE-THRESHOLD WATERMARK |
|---|---|---|---|---|
| FIG. 9A | FIG. 9B | FIG. 9C | FIG. 9D | FIG. 9E |

?- IS PROBABLY W

?- EITHER B OR W

ERROR DIFFUSION HALFTONE WATERMARKING

CROSS-REFERENCE TO RELATED APPLICATION

This is a continuation-in-part of U.S. Ser. No. 09/594,211 filed Jun. 14, 2000 and issued as U.S. Pat. No. 6,763,121.

BACKGROUND

Halftoning is performed to render continuous tone (contone) digital grayscale and color images into patterns of pixels that can be rendered on bi-level devices such as printers. The rendered images are commonly referred to as halftone images. The pixels of a halftone image are arranged in patterns such that the halftone image is perceived as having continuous tones when viewed through the human visual system.

As the print quality of printers increases, there is an increasing threat that these printers can be utilized in illegal or fraudulent operations. For example, these printers can be used to print counterfeit currency and other counterfeit prints (e.g., hard copies of copyrighted artwork and images).

Images may be watermarked, whereby information is added to or embedded in the images. The watermarks may be visible or imperceptible. The watermarks could be used to thwart counterfeiting operations. The standard watermark on a currency is a mark that is visible only when looking through (as opposed to at) the paper. This watermark will not survive any of the standard copying processes. Nevertheless, due to the good quality of the plain content counterfeit copies of currency will usually pass for good money.

The watermarks should be robust to non-destructive image processing procedures. For instance, if a watermark is added to a continuous tone image, and the watermarked continuous tone image is then halftoned, the watermark in the halftone image could be degraded.

The embedding process should not adversely affect the quality of the halftone images. Removing a good digital watermark would significantly degrade the halftone image, and would be easily noticeable.

The halftone watermarking may be performed during dither halftoning. However, the watermarking is typically performed independent of and separate from the halftoning process.

There is a need for a watermark that is robust to non-destructive image processing, and that significantly degrades image quality when removed. There is a need for a halftoning process that can add watermarks without adversely affecting the quality of halftone images.

SUMMARY

According to one aspect of the present invention, generating a watermarked halftone image from a continuous tone image includes performing halftoning on the continuous tone image while adding a watermark to the halftone image during the halftoning. Location of the watermark in the halftone image is based on prediction criteria.

According to another aspect of the present invention, generating a watermarked halftone image from a continuous tone image includes performing error diffusion halftoning on the continuous-tone image; and adding a watermark to the halftone image during the halftoning. Error caused by adding the watermark is diffused into the halftone image.

According to another aspect of the present invention, identifying a location of a watermark in a halftone image includes comparing predetermined neighborhood patterns to causal neighborhoods of a current pixel location of the halftone image; and selecting the location of a causal neighborhood that matches one of the predetermined patterns.

According to another aspect of the present invention, apparatus includes memory encoded with a plurality of predetermined neighborhood patterns. The neighborhood patterns, when applied to a halftone image, identify a watermarking location in the halftone image.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 8 is an illustration of an error diffusion halftoning filter according to an embodiment of the present invention.

FIGS. 9(a)-9(e) illustrate a hard copy output of the various error diffusion halftoning methods according to embodiments of the present invention.

DETAILED DESCRIPTION

Figure 1:
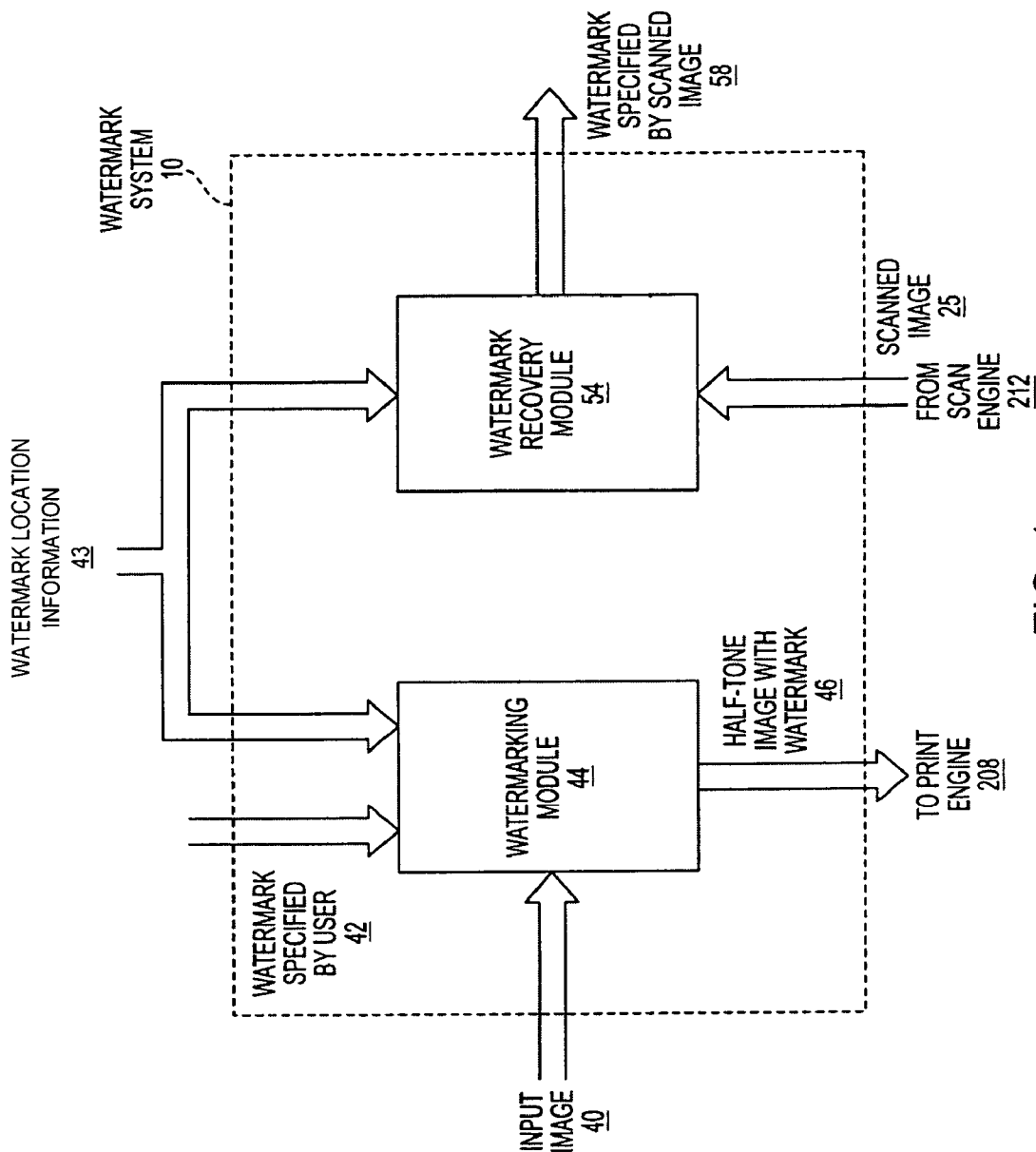
FIG. 1 is a block diagram of a watermarking system in accordance with one embodiment of the present invention.

As shown in the drawings for purposes of illustration, the present invention is embodied in methods of embedding an imperceptible watermark in a halftone image during error diffusion halftoning. The error diffusion halftoning provides room for minor pattern changes that are not perceptible but qualify for watermark information. By embedding the watermark during halftoning, the watermark becomes part of the halftone image. Contrast this to a conventional process of adding a watermark to a contone image, and then halftoning the watermarked contone image. Using the conventional process, the halftoning could change the watermark.

In some embodiments according to the present invention, the locations of the watermarks are based on prediction criteria and are added at image content dependent locations (i.e., locations that are determined during the halftone process and that are dependent on the prediction criteria and previously rendered pixel values or image content) of the digital image. In this regard, predictors or estimators may be used to better predict watermark locations that minimize distortion to the resulting watermarked halftoned image. Such watermarking provides increased security, since predetermined locations are not needed, and thus the hardcopies can be traced even after they are physically cut (as would usually be done for counterfeit currency and possibly other fraudulent art). Furthermore the use of watermark location prediction provides watermarks that are robust to cropping, namely using only a part of the document cut out of the full document.

FIG. 1 is a block diagram of a watermark system 10 in accordance with one embodiment of the present invention. The watermark system 10 includes a watermarking module 44 for generating a halftone image 46 with a watermark 42. The watermarking module 44 uses error diffusion halftoning to create a halftone image from a contone input image 40, while embedding the watermark 42 in the halftone image.

The watermark 42 may be a string of ones and zeros that is specified by the user. Preferably, the watermark is a data string (e.g., a serial number) that provides some form of identification, such as uniquely identifying either the rendering process the rendering device (e.g., a print engine), or the content (e.g. passport number embedded in a passport image). Information 43 supplied to the watermarking module 44 is used to determine the location of the water. The information 43 may specify a predetermined watermark location. In the alternative, the information 43 may include prediction criteria that is used to predict the location of the watermark 42. The prediction criteria may include previously rendered pixel values or image content.

The watermarked halftone image 46 may be printed by a print engine 208 (e.g., a printer). The watermark 42 is not perceptible in the resulting hard copy.

A hard copy (not necessarily the hard copy produced by the watermarking module 44) may be analyzed to determine whether it contains the watermark. The analysis may include scanning the hard copy with a scan engine 212, and using a watermark recovery module (WRM) 54 on the resulting scanned digital contone image 25. The watermark recovery module 54 checks the locations in the scanned image 25 that are specified by the watermark location information 43 in order to recover a watermark 58 in the scanned image. The recovered watermark 58 may be utilized, for example, to identify the rendering process or rendering device (e.g., printer) that printed the hard copy from which the scanned image 25 was obtained.

The print engine 208 and the scan engine 212 may be parts of different systems. Thus, the watermarked halftone image may have been printed with one system, but scanned with another system.

The watermarking module 44 may be a part of a printer. The printer receives a contone input image 40 and watermark location information (e.g., a watermark, and a location or prediction criteria) and uses the watermarking module 44 to generate a watermarked halftoned image 46. The print engine 208 of the printer prints out a hard copy of the watermarked halftone image.

In the alternative, a computer has a print driver that includes the watermarking module 44. The computer uses the print driver to create a watermarked halftone image, and sends the watermarked halftone image to the printer.

The watermark recovery module 54 may be part of a scanner. The scanner uses its scan engine 212 to generate a scanned digital contone image 25, and uses the watermark recovery module 54 to analyze the scanned image 25. In the alternative, a computer may run a program that includes the watermark recovery module 54. The scanner generates a scanned digital contone image 25, and sends the scanned image 25 to the computer. The computer uses the application to analyze the scanned image 25.

Watermarking can be standardized, which means there are multiple embedders (e.g., printers with watermark encoding capabilities) and readers such as scanners with the same watermark encoding and decoding capabilities. The embedders and readers may form a communication channel, where messages are transferred from sources (embedders) to destinations (readers) via a physical hardcopy. Alternatively there may be a single embedder and a single reading system for a particular type of halftone watermark.

Figure 2:
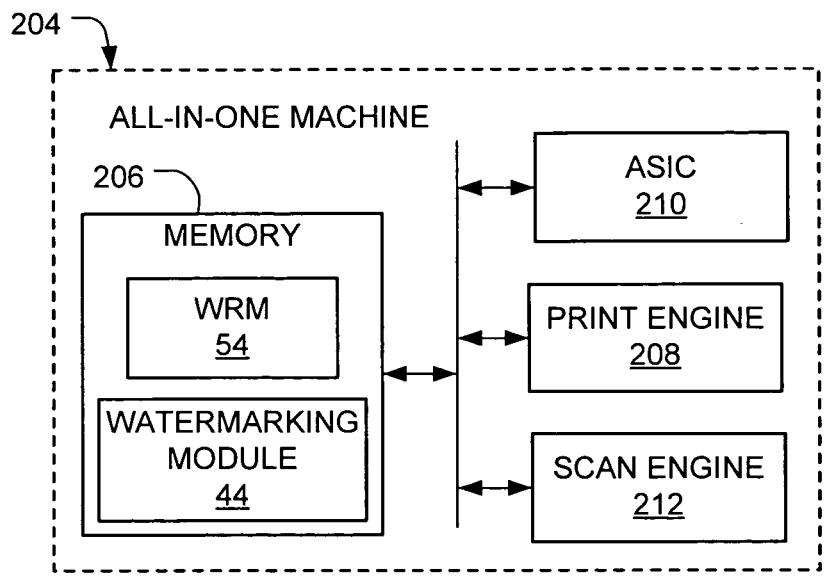
FIGS. 2 is an illustration of a system in accordance with embodiments of the present invention.

FIG. 2 illustrates an all-in-one machine 204 including a print engine 208, a scan engine 212, a watermarking module 44, and a watermark recovery module 54. It is preferable for the watermarking module 44 and the watermark recovery module 54 to reside in memory (e.g., a read only memory (ROM)) 206 of the all-in-one machine 204 and be accessible to the print engine 208 and the scan engine 212. The watermarking module 44 and the watermark recovery module 54 may executed by a dedicated processor in the form of an application specific integrated circuit (ASIC) 210 in the all-in-one machine 204.

Figure 3A:
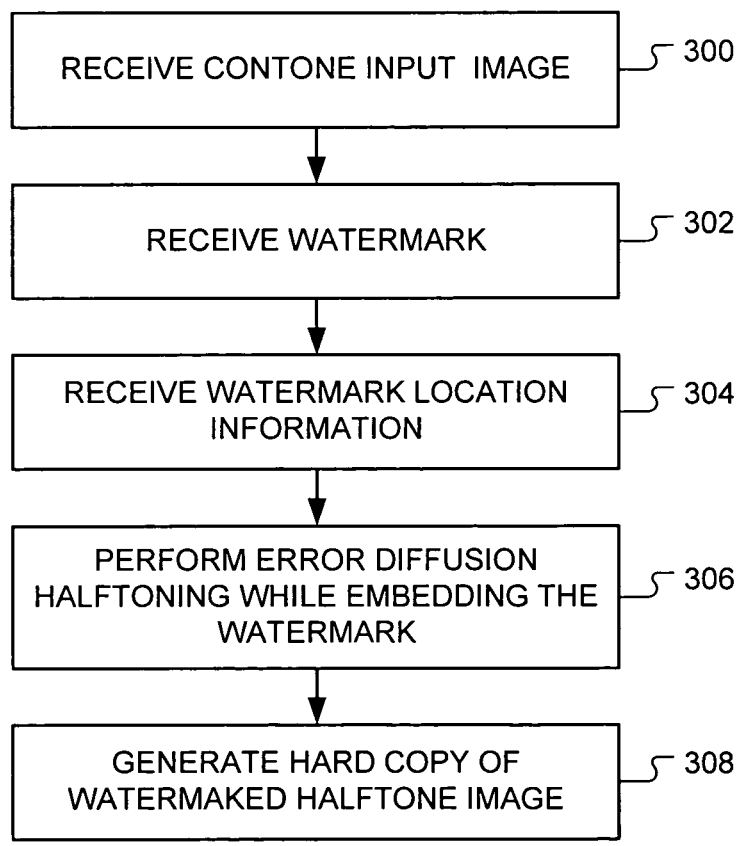
FIGS. 3a-3c are illustrations of methods in accordance with embodiments of the present invention.

FIG. 3a is a flowchart illustrating a watermarking method in accordance with an embodiment of the present invention. In step 300, the watermarking module 44 receives the contone input image 40. The input image 40 can be provided by any image source (e.g., an image file stored in a memory). For example, the original image 40 can be an image that is generated by a digital camera and then stored in a memory, or it can be a data file or other file.

In step 302, the watermarking module 44 receives the watermark 42 (e.g., a string of binary bits). The watermark 42 can include any desired information (e.g., information specified by a system designer) as long as it can be represented in a binary form. For example, the watermark 42 can be information that reveals one or more identifying characteristics regarding the halftone process through which the image is rendered. As an example, the watermark 42 includes an identifier (e.g., a serial number) of a printer 230 which can be represented as a string of binary bits.

In step 304, the watermarking module 44 receives the watermark location information 43. This information may specify a predetermined watermark location, or it may include prediction criteria that can be used to predict locations of the watermark.

In step 306, the watermarking module 44 performs error diffusion halftoning on the input image 40 to generate a watermarked halftone image 46. During this error diffusion process, the watermarking module 44 embeds the watermark 42 at the watermark locations 43 of the halftone image. In some embodiments, the watermark location may be predetermined, and in other embodiments, the watermark location may be predicted. In some embodiments, the error caused by adding the watermark may be diffused into the halftone image 46

In step 308, a print engine generates a hard copy of the watermarked halftone image 46.

Figure 3B:
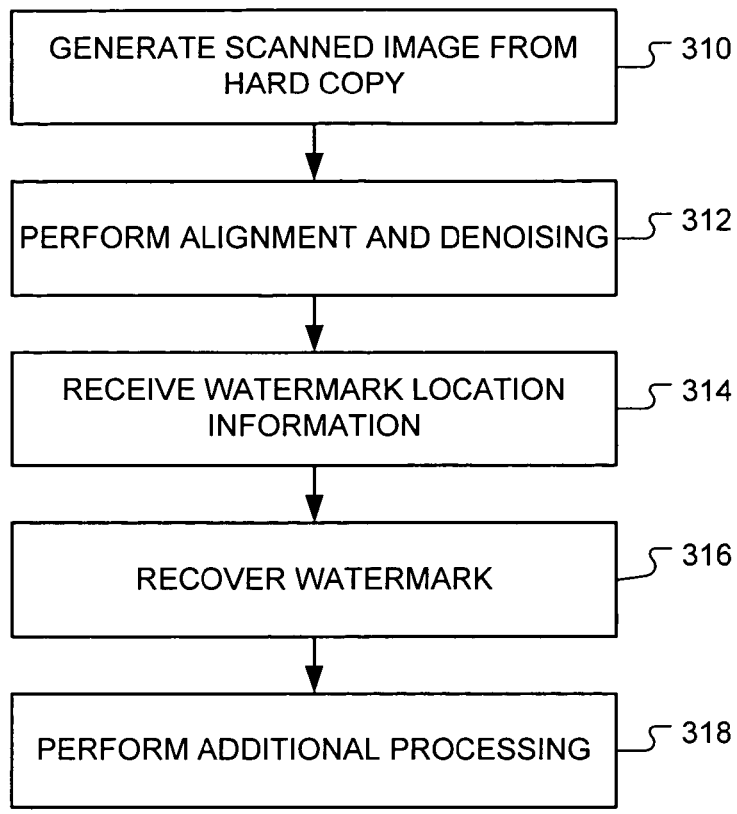

Steps 300-308 (embedding the watermark) could be performed by a first party, and the following steps in FIG. 3b (recovering the watermark) could be performed by a second party. In the alternative a single party could perform steps 300-308 to generate a first set of hardcopies of a watermarked halftone image. Later, the same party could perform the following steps in FIG. 3b on a second set of hard copies to determine which hard copies in the second set are original and which are counterfeit.

Reference is now made to FIG. 3b. In step 310, a hard copy is scanned by the scan engine 212 to produce a scanned image 25. The scanned image 25 is then provided to the watermark recovery program 54.

In step 312, the WRM 54 may perform alignment and de-noising on the scanned image 25. Alignment and de-noising are well known operations and can be accomplished by utilizing well-known techniques in the art.

In step 314, the WRM 54 receives the watermark location information. The watermark location information may be predetermined locations or predicted location criteria. If the location is not pre-determined, the WRM 54 predicts the watermark location. Step 314 may be skipped if the watermark location is predetermined and if the WRM 54 is already pre-programmed with the watermark location information.

At step 316, the WRM 54 recovers the watermark from the scanned image 25.

At step 318, additional processing may be performed on the recovered watermark 58. Even if the hard copy scanned at step 310 was produced by steps 300-308, the recovered watermark 58 might not be identical to the watermark 42 specified by the user. The recovered watermark 58 might have been corrupted sometime between steps 306 and 316. Additional processing such as error code correction may be performed.

Additional processing (318) may be performed on the recovered watermark. For example, inverse halftoning may be performed. Since the recovered watermark 58 is represented by a halftone pattern, the inverse halftoning may be used to convert the recovered watermark 58 into a continuous tone representation.

Figure 3C:
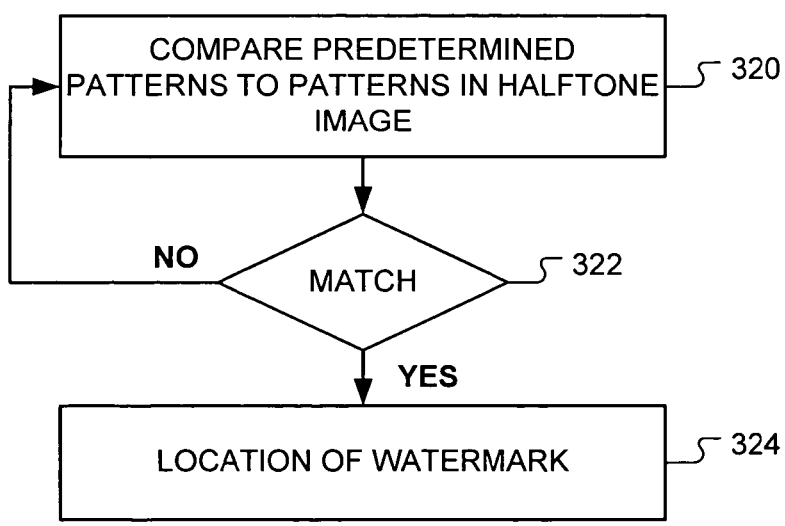

Reference is now made to FIG. 3c, which illustrates a method of predicting a watermark location from prediction criteria. This same method may be performed by the watermarking module 44 and the watermark recovery module 54. The watermark location information includes image content of the previously rendered pixel values in a halftone image. In other words, the prediction is usually limited to the data available in the causal halftone image. Here, the term "causal" refers to the pixels that were previously processed or rendered.

The watermark location information may also include a list of different pixel patterns. The list may be implemented as a lookup table.

At step 320, patterns of the halftone image are compared to the patterns in the list. If performed during watermarking, the patterns in the halftone image may be compared as soon as those patterns are rendered. Each rendered pattern may be compared to each pattern in the list until a match is found. If performed during watermark recovery, the patterns may sequentially accessed from the list, and each accessed pattern may be scanned across the halftone image until a match is found. When a pattern in the halftone image matches a pattern in the list (322), the watermark location is identified as the location of the matched pattern in the halftone image (324).

Construction of the list will now be described. Distortion in the halftone image is minimized when the watermark 42 is embedded. Distortion of the digital image is always a concern during the watermarking process since watermarking adds information that is unrelated to the image content to the digital image. For example, distortion occurs because certain pixels of the watermarked halftone image 46 reflect watermark values instead of image values. In other words, certain pixels need to be "changed" in order to reflect watermark values and embed information into the image. The term "flip" or "flipping" means changing a pixel's value (i.e., 0 or 1) from the intended value (i.e., the halftone value based on the image content) in the halftone image 46 to an opposite value for purposes of adding the desired watermark into the halftone image 46.

For example, if a pixel value at a particular location is supposed to be "0" in the halftone image based on the image content, but a watermark value of "1" is required at that pixel location, then the value of "1" is imposed at that location, thereby causing the value of "0" to be changed or flipped to a value of "1". As a result, distortion can be serious if a significant number of pixels need to be flipped in order to embed the watermark 42.

The measure of distortion can be symbolized by $d_{ij}$. Both the watermarking module 44 and the WRM 54 can use the same list to determine the locations, where the watermark can be imposed, that minimizes distortion ($d_{ij}$).

A list in the form of a lookup table is generated off-line based on a database of natural images. The lookup table can have two columns: one column for listing the different patterns of the causal neighborhood, and a second column for listing the distortion measure. Alternatively, the lookup table can include a single column of causal neighborhoods that have a distortion measure below a predetermined distortion level. For example, during the design process the top ten or twenty patterns having the least amount of distortion can be selected to form the lookup table depending on the number of bits of information to be embedded into the image.

The lookup table is utilized to generate predicted locations for inserting watermark values based on a predetermined causal neighborhood (e.g., a neighborhood of 21 previously rendered pixels). For example, when determining whether to insert a watermark at the current location, the watermarking module receives previously rendered pixels (e.g., a neighborhood of twenty one previously rendered pixels), compares these pixels to patterns in the lookup table, and based on this comparison determines if the current locations is a watermark location. Each pixel location is evaluated by consulting the lookup table in a similar fashion.

Figure 11A:
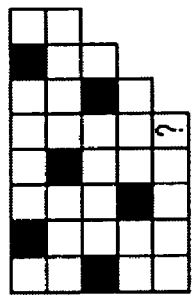
FIGS. 11(a) and 11(b) illustrate pixels in causal neighborhoods indicating large and small amounts of distortion, respectively.

This process can be illustrated in connection with the example of FIGS. 11(a) and 11(b). FIG. 11(a) illustrates a first causal halftone neighborhood and a current pixel (marked by "?"). Consider that a low $d_{ij}$ means that both the black and white halftones are reasonable possibilities for $h_{ij}$. Therefore, for FIG. 11(a), a black halftone is not a reasonable possibility at that location, so the predictor should indicate that $d_{ij}$ is large.

Figure 11B:
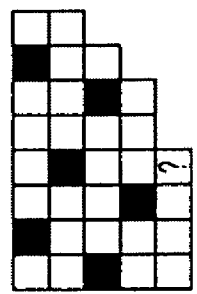

On the other hand, in FIG. 11(b), both black and white halftones seem to be reasonable possibilities for the location, and so in this case, the predictor should indicate that $d_{ij}$ is small, and that this location is suitable for imposing a watermark value. This example does not constitute a real estimator or predictor of $d_{ij}$, nor is such an estimator necessary. All that is needed is an estimation of whether $d_{ij}$ is smaller than a predefined threshold value which determines the distortion. Since it is time-consuming to operate determine distortion error in real time, it is preferable to perform the use the lookup table, which estimates a small $d_{ij}$.

A causal estimator of low $d_{ij}$ values is provided which allows for consistent determination of watermark embedding locations in both the encoder and the decoder. Its derivation is based on statistics obtained from a database of natural images. The estimation can be performed off-line in the following manner.

Natural images can be represented by a set of 249 images of constant gray level $\{4,5, \ldots 251\}$ with additive independent noise distributed uniformly in the range $\{-4,4\}$. The size of all images can be 500×500. This set of images are halftoned without any watermark. The resulting "natural halftones" are then analyzed to find a set of predominant neighborhoods (e.g., neighborhoods with more than 50 occurrences). Then, the sample average of $d_{ij}$ is calculated for each predominant neighborhood. Each value for each predominant neighborhood represents the expected average square distortion incurred if the corresponding neighborhood is added to the estimator's lookup table. Finally, the predominant neighborhoods are ordered on a list in an increasing order of distortion.

Partial lists taken off the top of this list are used for the lookup tables. More entries in the lookup table correspond to higher rate and higher distortion. Here, the term "rate" means the number of watermark pixels divided by the total number of pixels in the original image 40.

Figure 12:
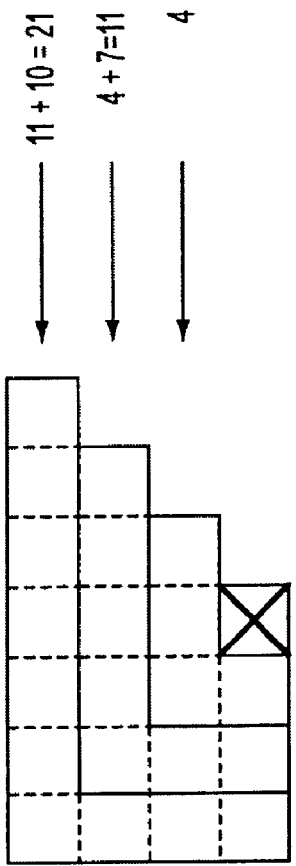
FIG. 12 illustrates three neighborhoods of different sizes that can be selected for use in the causal predictor module of one embodiment of the present invention.

The above steps can be performed for different neighborhood sizes, such as neighborhood sizes of 4, 11 and 21. These neighborhoods are depicted in FIG. 12, and each neighborhood is causally nested within each other.

The lookup table or tables can be stored in memory of the machine or machines performing the watermarking and watermark recovery. For example, a lookup table can be stored in memory 206 of the all-in-one machine 204 of FIG. 2.

Different embodiments of a watermarking module 44 are illustrated in FIGS. 5-7 and 10. Before describing these different embodiments, however, conventional error diffusion halftoning will be described. In describing the conventional error diffusion, certain terms will be introduced. When describing these watermarking embodiments, continuous-tone information (e.g., gray level values) from the input image 40 (e.g., a continuous tone image) will be represented by the notation $g_{ij}$.

Figure 4:
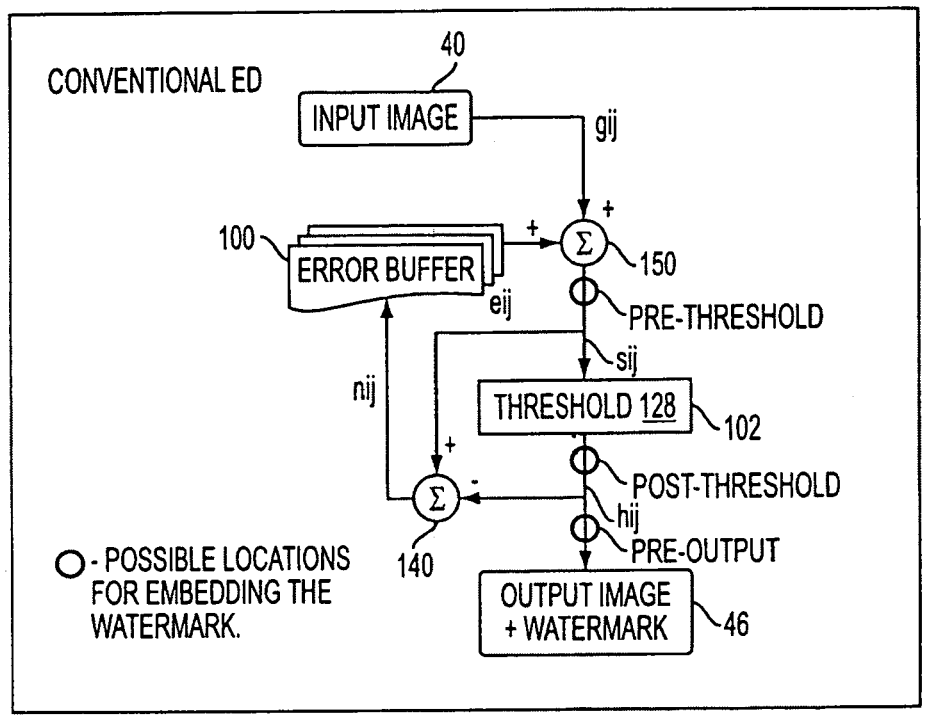
FIG. 4 is an illustration of conventional error diffusion halftoning.

As illustrated in FIG. 4, a corresponding error value denoted by $e_{ij}$ is added to the continuous tone value by an adder 150 to provide a desired value denoted by $s_{ij}$, which represents the value that is desired for the ij location. The error value $e_{ij}$ is incurred by previous halftone pixel values and is stored in an error buffer 100.

At this point, the desired value $s_{ij}$ is provided to a comparator 102 where it is compared with a predetermined threshold. Since only halftone values (0 or 255) are possible, the predetermined threshold is usually selected to be 128. As a result, the output of the comparator 102 (denoted by $h_{ij}$) will be:

$h_{ij}=255$ if $s_{ij} \geq 128$
$h_{ij}=0$ if $s_{ij}<128$

Here, $h_{ij}$ is the halftone value for the location ij.

The new error $n_{ij}$ is determined by: $n_{ij}=s_{ij}-h_{ij}$, at an adder 140, as illustrated in FIG. 4. The new error $n_{ij}$ is diffused to future incoming pixels (i.e., neighboring pixels that have yet to be halftoned) by providing it to the error buffer 100. One possible diffusion method can be implemented by a diffusion filter described by R. Floyd and L. Steinberg in "An adaptive algorithm for spatial gray scale", *SID Symposium*, pages 36-37, 1975, whose disclosures are incorporated by this reference as though fully set forth herein. Referring to FIG. 8, Floyd and Steinberg's diffusion filter is related to a conventional raster scan, where 7/16 of $n_{ij}$ is diffused forwards, 1/16 of $n_{ij}$ is diffused to the location one pixel ahead in the next line, 5/16 of $n_{ij}$ is diffused to the same location in the next line, and 3/16 of $n_{ij}$ is diffused to one position rearwardly in the next line.

Figure 5:
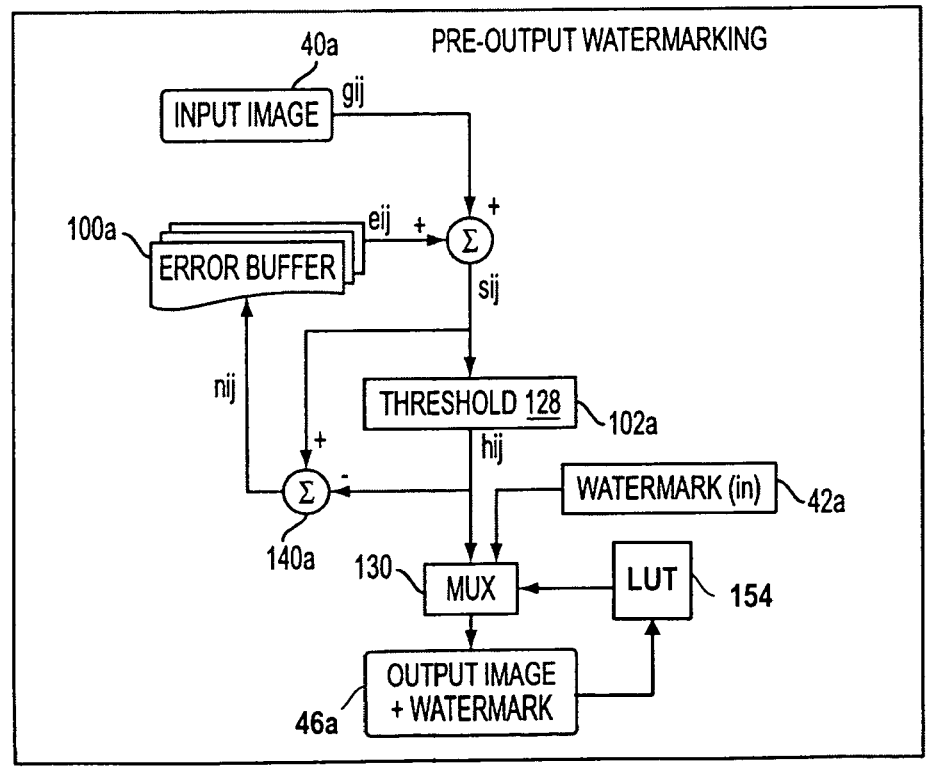
FIG. 5 is an illustration of a method of error diffusion halftoning according to an embodiment of the present invention.

Reference is now made to FIG. 5, which illustrates "Pre-Output" watermarking. The same numerals are used in FIG. 5 for the same elements set forth in FIG. 4, except that an "a" has been added to the numeral designations in FIG. 5. In the Pre-Output watermarking, previously rendered pixel values are supplied to a lookup table 154, which predicts the watermark location. The watermark 42*a* is imposed by simply replacing the halftone pixel $h_{ij}$ at the predicted locations by the next watermark pixel bit $w_k$ just prior to outputting the halftone image. It is noted that the imposed watermark values are not provided to adder 140*a*.

A multiplexer 130 can be positioned with a first input coupled to the output of the comparator 102*a*, and a second input coupled to the watermark 42*a*. The multiplexer 130 has a third input that receives signals indicating the predicted locations where the watermark values are to be imposed on the halftone pixel $h_{ij}$. Thus, in the Pre-Output watermarking scheme of FIG. 5, the new error $n_{ij}$ is not affected by the watermark pixels $w_k$.

Thus the "predicted" watermark locations are based on lookup tables and are dependent on the halftone image (e.g., the previously rendered pixels that neighbor the current pixel). In this regard, the predicted locations can be different for different images and are calculated based on the lookup tables for each different image as the image is being rendered. However, given the same image and lookup tables, the method of FIG. 5 predicts the same watermark locations.

Figure 6:
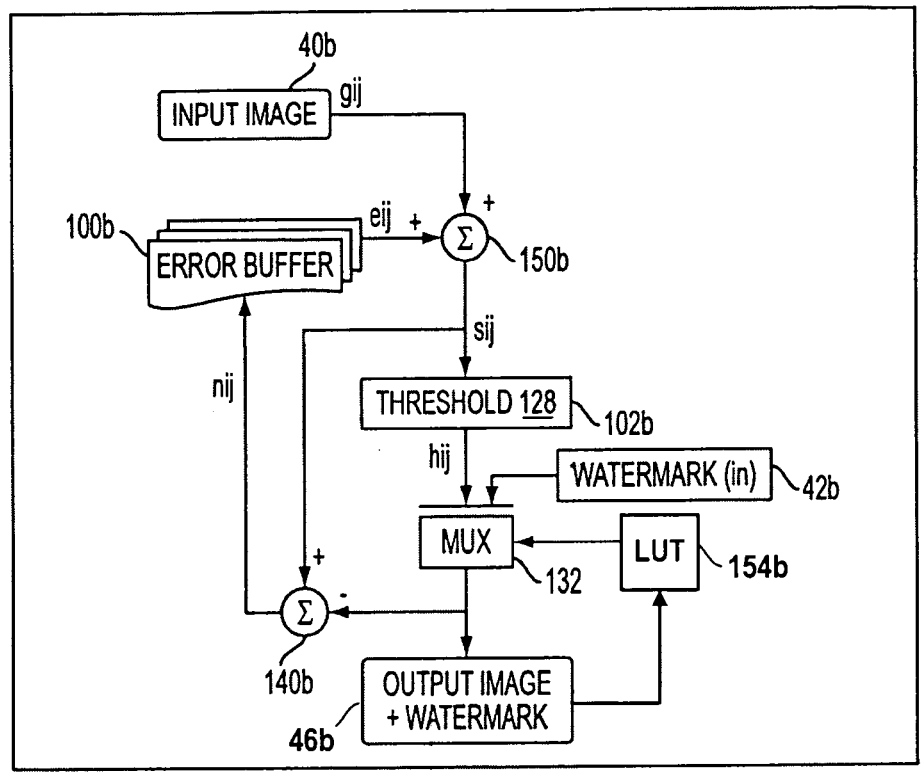
FIG. 6 is an illustration of a method of error diffusion halftoning according to an embodiment of the present invention.

Reference is now made to FIG. 6, which illustrates "Post-Threshold" watermarking. The same numerals are used in FIG. 6 for the same elements set forth in FIG. 4, except that a "b" has been added to the numeral designations in FIG. 6. In the post-threshold watermarking technique, the pixels of the watermark 42*b* are imposed on the pixel values $h_{ij}$ that emerge from the comparator 102*b*, and the changed values of $h_{ij}$ are re-routed to influence the new error $n_{ij}$. In other words, the watermark 42*b* is imposed by replacing the halftone pixel $h_{ij}$ at the predetermined or predicted locations by the next watermark pixel bit $w_k$, but the watermarking will be accounted for when determining the new error $n_{ij}$.

A multiplexer 132 can be positioned with a first input coupled to the output of the comparator 102*b*, and a second input coupled to the watermark 42*b*, and with its output coupled to the adder 140*b* that determines the new error $n_{ij}$. The multiplexer 132 has a third input that receives signals indicating the locations where the halftone pixel $h_{ij}$ is to be imposed. Thus, in the Post-Threshold watermarking scheme of FIG. 6, the error diffusion mechanism can be used to hide the watermark 42*b* by modifying the future halftone patterns. In other words, the resulting error caused by the imposing of the watermark is diffused.

Figure 7:
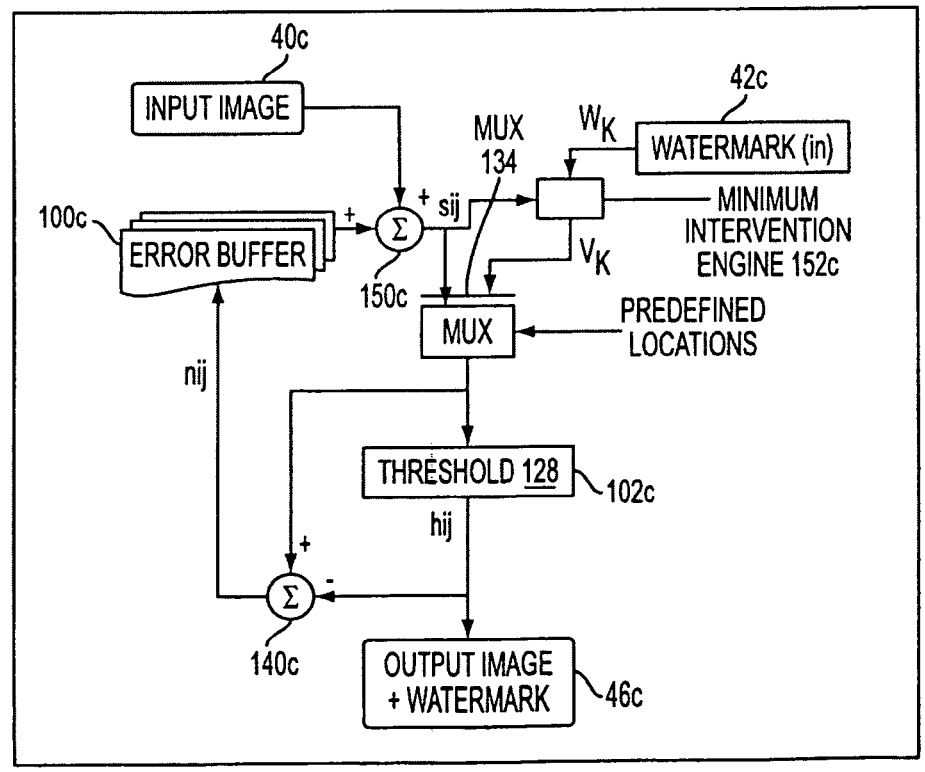
FIG. 7 is an illustration of a method of error diffusion halftoning according another embodiment of the present invention.

Reference is now made to FIG. 7, which illustrates "Pre-Threshold" watermarking. The same numerals are used in FIG. 7 for the same elements set forth in FIG. 4, except that a "c" has been added to the numeral designations in FIG. 7. In the pre-threshold watermarking, the watermark 42*c* is introduced to the desired value $s_{ij}$ prior to thresholding. In particular, the watermark 42*c* is embedded by imposing the desired value $s_{ij}$ at the predetermined locations with minimal intervention values $v_k$. The minimal intervention values $v_k$ are as follows:

(when there is consensus) $v_k=s_{ij}$
(no consensus and $w_k=255$) $v_k=128$; and
(no consensus and $w_k=0$) $v_k=127$;

where "consensus" means that $s_{ij}$ will produce $w_k$ after thresholding. In other words, no need for intervention. If there is no consensus between $w_k$ and the expected threshold of $s_{ij}$, and if the desired watermark pixel bit $w_k$ is 255, $v_k$ is set to equal 128 which is the smallest value needed to produce a pixel value after thresholding of 255. For example, if $s_{ij}$ is 50, then the value of $v_k$ is changed to 128 in order to generate a pixel value of 255. Similarly, if there is no consensus between $w_k$ and the expected threshold of $s_{ij}$, and if desired watermark pixel bit $w_k$ is 0, then $v_k$ is set to equal 127 which is the largest value acceptable to produce a pixel value after thresholding of 0. For example, if $s_{ij}$ is 130, then the value of $v_k$ is changed to equal 127 in order to generate a pixel value of 0. Thus, these examples illustrate the meaning of the term "minimal intervention", where the watermarking attempts to intervene in as minimal a degree as possible with the values of $s_{ij}$ by assigning the smallest or largest value possible to produce the desired watermark value.

A multiplexer 134 can be positioned with a first input coupled to the output of the adder 150c, a second input coupled to the watermark 42c through a minimal intervention engine 152c, and with its output coupled to both the comparator 102c and the adder 140c that determines the new error $n_{ij}$. The multiplexer 134 has a third input that receives signals 43c indicating the predetermined locations where the watermark values are to be imposed.

A comparison of the amount of distortion that can result from each of the watermarking techniques is illustrated in FIGS. 5-7. For the pre-threshold watermarking of FIG. 7, the watermark embedding is accomplished with minimal intervention, so that the distortion may be attributed to the present location with no diffusion artifacts. The distortion at each location (ij) is denoted $d_{ij}$, and can be shown to be $d_{ij}=|s_{ij}-128|$.

In this regard, FIGS. 9(a)-9(e) illustrate examples of watermarked halftone images rendered using the techniques of FIGS. 5-7. FIG. 9(a) is a halftoned image that does not include a watermark. The predetermined watermark locations are illustrated in FIG. 9(b). FIGS. 9(c)-9(e) illustrate the halftone image of FIG. 9(a) after embedding the watermark information at the locations depicted in FIG. 9(b) using the Pre-Output, Post-Threshold and pre-threshold watermarking techniques, respectively. By comparing FIGS. 9(c)-9(e), it can be seen that the post-threshold and pre-threshold watermarking techniques produce better results (i.e., a halftone image that is closest to the intended halftone image).

Since the human visual system cuts off high frequency noise but is sensitive to low frequency noise, the images generated by the pre-threshold watermarking technique of the present invention has the least amount of low-frequency noise. For example, low frequency noise in the form of clusters of white or black dots or strings of black pixels and strings of white spaces, is very evident in FIG. 9(c), less evident in FIG. 9(d), and even less evident to a viewer in FIG. 9(e). One reason for the better quality in FIG. 9(e) is that the error of pre-threshold watermarking is predominantly high frequency, thereby reducing visible noticeability, especially in a halftone image.

Figure 10:
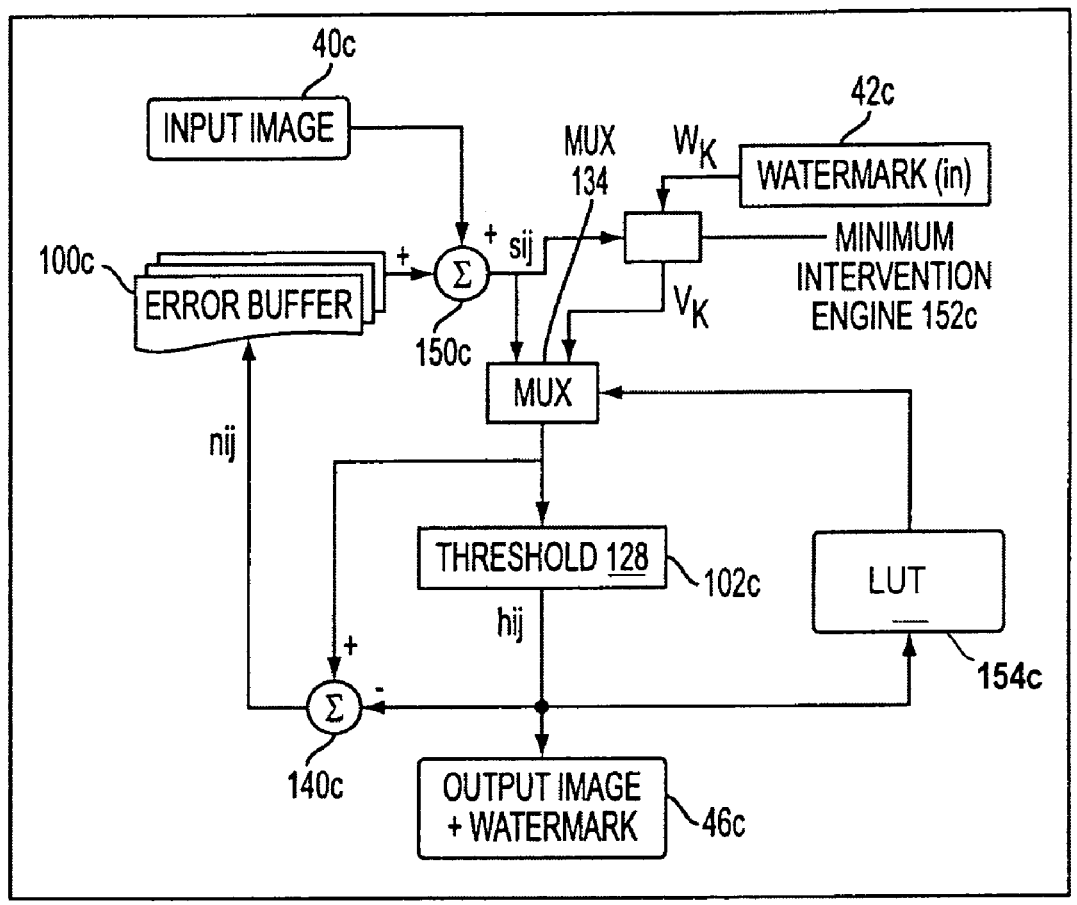
FIG. 10 is an illustration of an error diffusion halftoning method according to an embodiment of the present invention.

Reference is now made to FIG. 10, which is a modification of the embodiment shown in FIG. 7. Instead of the third input of the multiplexer 134 receiving signals that indicate the predetermined locations where the watermark is to be imposed, the third input is coupled to a lookup table 154, which receives watermark location information. In addition, the $h_{ij}$ output from the comparator 102c is also looped to an input of the lookup table 154 to provide the output image to predictor module 154. Thus, the lookup table 154 uses the predicted location criteria and the pixel values from the halftone image to generate the predicted locations where the watermark values are to be imposed.

The error diffusion halftoning according to the present invention may be used in applications where digital security and identification are desired. A first application related to digital security is to use the present invention to watermark prints in order to authenticate that print or document. A second application related to identification is to use the present invention to identify the printer that produced a particular print or document.

A third application is copyright enforcement and fraud detection. In this application, the watermark recovery module is utilized to identify the source of the print. For example, the watermark recovery module can be used to scan in the print, and based on the scan of the print to quickly retrieve and provide an identifier of the offending printer for subsequent prosecution.

Error diffusion halftoning according to the present invention can be applied to other applications including, but are not limited to, tracing of illegal image documents, embedding digital signatures for authentication purposes, authenticating picture identification cards, and the attribution of functionality to paper.

Predicted watermark locations are not limited to error diffusion halftoning. For example, the watermark location prediction may be used with dither halftoning.

Although the present invention has been described in connection with a printer that employs a half tone process for printing hard copies, the teachings herein can be applied to other applications. For example, displays (e.g., those used with personal digital assistants (PDAs) with space and size limits may use a halftone process for displaying information. These displays can incorporate the present invention to embed and recover watermarks from images displayed on these displays. The teachings herein can be utilized in any device or application that employs a half tone process to generate a halftone image and that has a need to include a watermark in that halftone image.

Although several specific embodiments of the present invention have been described and illustrated, the present invention is not limited to the specific forms or arrangements of parts so described and illustrated. Instead, the present invention is construed according to the following claims.

What is claimed is:

1. A method of generating a watermarked halftone image from a continuous tone image, the method comprising operating a processor to perform operations comprising halftoning the continuous tone image while adding a watermark to the halftone image during the halftoning; wherein the adding comprises locating the watermark in the halftone image at pixel locations in the halftoned image where the watermark is determined to produce minimal distortion in the watermarked halftone image, and the locating of the watermark in the halftone image is based on comparisons of previously rendered pixels of the halftone image to predetermined pixel patterns.

2. The method of claim 1, wherein the halftoning is error diffusion halfioning, and wherein error caused by adding the watermark is diffused into the halftone image.

3. The method of claim 1, wherein the locating comprises retrieving the predetermined pixel patterns from a lookup table and comparing the previously rendered pixels to the retrieved predetermined pixel patterns.

4. A computer readable medium having computer-readable program code embodied therein, the computer-readable program code adapted to be executed by a processor to perform a method comprising:

halftoning the continuous tone image while adding a watermark to the halftone image during the halfioning;

wherein the adding comprises locating the watermark in the halftone image at pixel locations in the halftoned image where the watermark is determined to produce minimal distortion in the watermarked halftone image, and the locating of the watermark in the halftone image is based on comparisons of previously rendered pixels of the halftone image to predetermined pixel patterns.

5. Apparatus, comprising:
a memory storing program code; and
a processor coupled to the memory, operable to execute the program code, and based at least in part on the execution of the program code operable to perform operations comprising
halftoning the continuous tone image while adding a watermark to the halftone image during the halftoning;
wherein the adding comprises locating the watermark in the halftone image at pixel locations in the halftoned image where the watermark is determined to produce minimal distortion in the watermarked halftone image, and the locating of the watermark in the halftone image is based on comparisons of previously rendered pixels of the halftone image to predetermined pixel patterns.

6. A printer, comprising:
a memory storing program code; and
a print engine coupled to the memory, operable to execute the program code, and based at least in part on the execution of the program code operable to perform operations comprising
halftoning the continuous tone image while adding a watermark to the halftone image during the halfioning;
wherein the adding comprises locating the watermark in the halftone image at pixel locations in the halftoned image where the watermark is determined to produce minimal distortion in the watermarked halftone image, and the locating of the watermark in the halftone image is based on comparisons of previously rendered pixels of the halftone image to predetermined pixel patterns.

7. A method of generating a watermarked halftone image from a continuous-tone image, the method comprising operating a processor to perform operations comprising:
performing error diffusion halftoning on the continuous-tone image; and
adding a watermark to the halftone image during the halftoning;
wherein error caused by adding the watermark is diffused into the halftone image, the performing comprises thresholding pixel values derived from combinations of pixels of the continuous tone image and diffused error values, and the adding of the watermark is performed before the thresholding.

8. The method of claim 7, wherein the adding comprises locating the watermark in the halftone image at locations in the halftoned image where the watermark is determined to produce minimal distortion in the watermarked halftone image.

9. The method of claim 7, wherein the adding comprises locating the watermark in the halftone image at predetermined locations in the halftoned image.

10. A method of generating a watermarked halftone image from a continuous-tone image, the method comprising operating a processor to perform operations comprising:
performing error diffusion halftoning on the continuous-tone image; and
adding a watermark to the halftone image during the halftoning;
wherein error caused by adding the watermark is diffused into the halftone image, the performing comprises thresholding pixel values derived from combinations of pixels of the continuous tone image and diffused error values, and the adding of the watermark is performed after the thresholding.

11. A printer, comprising:
a memory storing program code; and
a print engine coupled to the memory, operable to execute the program code, and based at least in part on the execution of the program code operable to perform operations comprising
performing error diffusion halftoning on the continuous-tone image; and
adding a watermark to the halftone image during the halftoning;
wherein error caused by adding the watermark is diffused into the halftone image, the performing comprises thresholding pixel values derived from combinations of pixels of the continuous tone image and diffused error values, and the adding of the watermark is performed before the thresholding.

12. Apparatus, comprising:
a memory storing program code; and
a processor coupled to the memory, operable to execute the program code, and based at least in part on the execution of the program code operable to perform operations comprising
performing error diffusion halftoning on the continuous-tone image; and
adding a watermark to the halftone image during the halftoning;
wherein error caused by adding the watermark is diffused into the halftone image, the performing comprises thresholding pixel values derived from combinations of pixels of the continuous tone image and diffused error values, and the adding of the watermark is performed before the thresholding.

13. A computer-readable medium having computer-readable program code embodied therein, the computer-readable program code adapted to be executed by a processor to perform a method comprising:
performing error diffusion halftoning on the continuous-tone image; and
adding a watermark to the halftone image during the halftoning;
wherein error caused by adding the watermark is diffused into the halftone image, the performing comprises thresholding pixel values derived from combinations of pixels of the continuous tone image and diffused error values, and the adding of the watermark is performed before the thresholding.

14. A printer, comprising:
a memory storing program code; and
a print engine coupled to the memory, operable to execute the program code, and based at least in part on the execution of the program code operable to perform operations comprising
performing error diffusion halftoning on the continuous-tone image; and
adding a watermark to the halftone image during the halfioning;
wherein error caused by adding the watermark is diffused into the halftone image, the performing comprises thresholding pixel values derived from combinations of pixels of the continuous tone image and diffused error values, and the adding of the watermark is performed after the thresholding.

15. Apparatus, comprising:

a memory storing program code; and a processor coupled to the memory, operable to execute the program code, and based at least in part on the execution of the program code operable to perform operations comprising performing error diffusion halftoning on the continuous-tone image; and adding a watermark to the halftone image during the halftoning;

wherein error caused by adding the watermark is diffused into the halftone image, the performing comprises thresholding pixel values derived from combinations of pixels of the continuous tone image and diffused error values, and the adding of the watermark is performed after the thresholding.

16. A computer-readable medium having computer-readable program code embodied therein, the computer-readable program code adapted to be executed by a processor to perform a method comprising:

performing error diffusion halftoning on the continuous-tone image; and adding a watermark to the halftone image during the halftoning; wherein error caused by adding the watermark is diffused into the halftone image, the performing comprises thresholding pixel values derived from combinations of pixels of the continuous tone image and diffused error values, and the adding of the watermark is performed after the thresholding.

* * * * *

UNITED STATES PATENT AND TRADEMARK OFFICE
CERTIFICATE OF CORRECTION

| | |
|---|---|
| PATENT NO. | : 7,660,429 B2 |
| APPLICATION NO. | : 10/889327 |
| DATED | : February 9, 2010 |
| INVENTOR(S) | : Doron Shaked et al. |

Page 1 of 1

It is certified that error appears in the above-identified patent and that said Letters Patent is hereby corrected as shown below:

In column 10, line 51, in Claim 2, delete "halfioning," and insert -- halftoning, --, therefor.

In column 10, line 62, in Claim 4, delete "halfioning;" and insert -- halftoning; --, therefor.

In column 11, lines 26-27, in Claim 6, delete "halfioning;" and insert -- halftoning; --, therefor.

In column 12, line 61, in Claim 14, delete "halfioning;" and insert -- halftoning; --, therefor.

Signed and Sealed this

Eighth Day of June, 2010

David J. Kappos
*Director of the United States Patent and Trademark Office*